Aug. 23, 1932.  D. ELDER  1,873,321
HOSE SPRAY NOZZLE
Filed Dec. 28, 1929
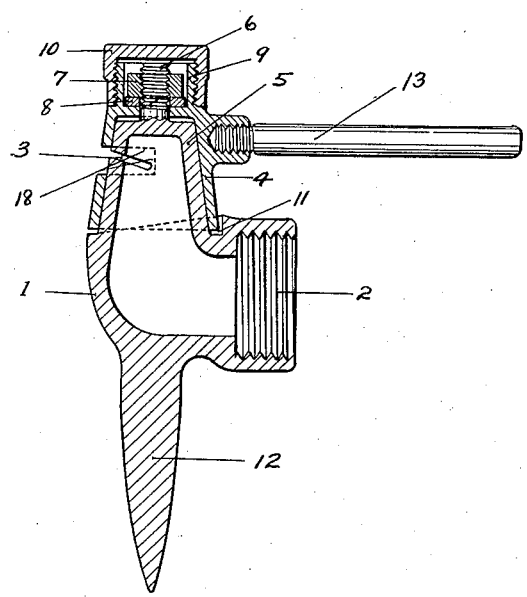
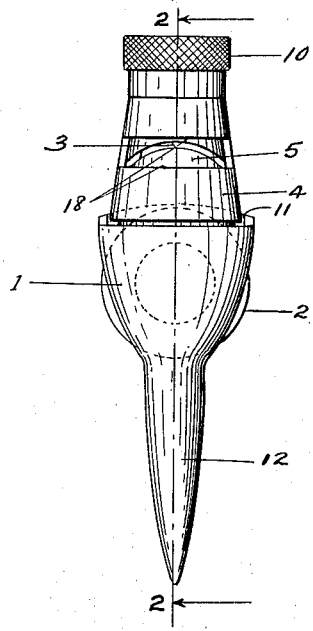
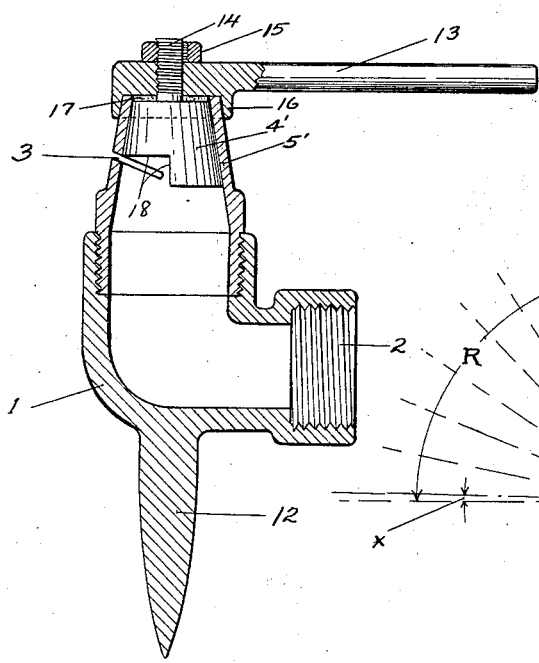
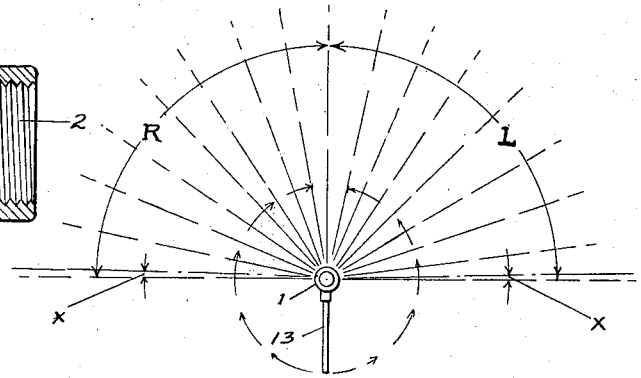
INVENTOR.
DONALD ELDER
BY
ATTORNEYS.

Patented Aug. 23, 1932

1,873,321

UNITED STATES PATENT OFFICE

DONALD ELDER, OF BERKELEY, CALIFORNIA

HOSE SPRAY NOZZLE

Application filed December 28, 1929. Serial No. 417,088.

This invention relates to a spray nozzle as used at the end of a garden hose for the watering of gardens and lawns, and the objects of the invention are to provide a spray nozzle which will produce a fan-shaped spray which may be adjusted for various segments of a circle, or in other words, to open and close the fan from either side to any degree.

In the drawing accompanying this application Fig. 1 is a front elevation of one form of my improved spray nozzle.

Fig. 2 is a vertical section of Fig. 1 as seen from the line 2—2.

Fig. 3 is a vertical section similar to that of Fig. 2 but showing a modified form of my device.

Fig. 4 is a diagrammatic plan view showing the fan-shaped spray produced by my nozzle and indicating the various degrees from right or left to which the fan may be closed.

Briefly described the invention is a nozzle adapted for attaching to the end of a garden hose and comprising a cylindrical chambered body with an angular slit in its forward wall and a rotary valve member adapted upon turning to close off more or less of this slit from either end or to expose the whole slit fully open. The length of the slit and its angle is such that when fully open it will produce a fan-shaped spray or rather spray an area terminating in a straight line which would form the base of the fan ordinarily extending at right angles to the run of the hose, then by manipulating of the valve this fan could be closed off from either side from a half circle to a quarter circle—either right-hand or left-hand, or to any other degree of a circle down to a substantially straight jet at either end of the slit, or shut off entirely.

In the drawing, Figs. 1 and 2, the body of the device is designated 1, threaded hose connection 2, slit 3, and valve 4.

The valve 4 is an inverted tapered cup fitting over a tapered hub 5 in which the slit 3 is formed, and the hub 5 carries a threaded extension 6 passing through an aperture in the bottom of the cup 4 and carrying a nut 7 screwed against a split spring washer 8 lying against the cup so as to resiliently hold the tapered parts in contact against leakage of water.

The inverted cup valve is provided with a threaded circular wall 9 surrounding the nut and covered with a screw cap 10.

At the sides and to the rear of the valve the body is recessed as at 11 so as to guard against possible rearward leakage under the valve, while at the lower part of the body I preferably provide a spike 12 for pushing into the earth when long continued sprinkling in one place is desired.

A handle 13 extends horizontally from the rotatable valve so that it may be easily turned to any desired position.

In the modification shown in Fig. 3 the general construction is the same as described for Fig. 2 and corresponding parts bear the same numbers.

The tapered hub is here numbered 5' and is preferably a separate piece from the body proper as indicated, and the valve 4' works inside the conical hub instead of outside so that the effect of water pressure is to hold it tightly seated at all times.

In this construction the valve itself has a threaded extension 14 preferably formed with a flattened side fitting a similarly shaped hole in the handle 13 so as to turn with the handle, while a nut 15 on top of the threaded extension serves for adjustment of the valve initially to a proper frictional fit.

The handle here shown as a single lever may of course be of any other form and it is provided with a rim 16 extending downward around the tapered or conical hub 5' so as to protect it to a certain extent against accidental injury, while between the handle and upper end of the valve I preferably insert a soft felt washer 17 to doubly insure against possible leakage.

With either form of the device the action is the same. The slit extends from its center at the outermost point of the circumference of the tubular valve body rearwardly and downwardly at about the angle indicated to terminate at a vertical plane passing just forward of the center of the structure, and both rotatable valve portions are cut away as at 18 so that the entire slot will be exposed when the handle 13 is turned straight back and at which position the slot will evenly spray a fan-shaped area or half circle as shown in Fig. 4.

If the handle is turned 90 degrees to the right or left the spray area will be 90 degrees of a circle as indicated respectively at L and R in the diagram, while for varying degrees of adjustment the fan will vary accordingly all the way to a small substantially straight stream as indicated at X, or shut off entirely if the handle is turned 180 degrees from the position shown in the drawing figures.

A feature of the invention is the shape and angle of the slot, for I have discovered that a perfectly straight saw slot extending at an angle substantially as shown will sprinkle the fan-shaped area evenly at all points, and by the adjustment of the length of the slot by turning the valve the area may be fitted to the various corners and sides of the garden to be watered.

I claim:

1. A sprinkler nozzle comprising a hollow body provided with an upwardly extending conical portion with a transversely extending slit therein extending at its ends at an angle downwardly and rearwardly into the body, and a rotary valve seated against said conical portion adapted for closing off the slit from one end while maintaining the width thereof.

2. A sprinkler nozzle comprising a hollow body provided with an upwardly extending conical portion with a transversely extending slit therein extending at an angle downwardly and rearwardly into the body, and a rotary valve seated against said conical portion adapted for closing off the slit from either end progressively while maintaining the width thereof.

3. In a structure as specified in claim 1, said valve positioned within said conical portion tending to be held in seating relation therewith by water pressure from within the body.

4. In a structure as specified in claim 1, said conical portion being open at the upper end, the valve being within the conical portion, and a handle on said valve above the open end of said conical portion.

5. In a structure as specified in claim 1, said conical portion being open at the upper end, the valve being within the conical portion, a handle on said valve above the open end of said conical portion, means for adjusting the frictional fit of the valve within said conical portion, and a gasket washer between said handle and the upper end of the valve.

DONALD ELDER.